(12) United States Patent
Tucker et al.

(10) Patent No.: US 11,584,057 B2
(45) Date of Patent: Feb. 21, 2023

(54) SYSTEMS AND METHODS FOR ADDITIVE MANUFACTURING

(71) Applicant: General Electric Company, Schenectady, NY (US)

(72) Inventors: Michael Robert Tucker, Niskayuna, NY (US); Younkoo Jeong, Clifton Park, NY (US); William Thomas Carter, Galway, NY (US)

(73) Assignee: General Electric Company, Schenectady, NY (US)

(*) Notice: Subject to any disclaimer, the term of this patent is extended or adjusted under 35 U.S.C. 154(b) by 479 days.

(21) Appl. No.: 15/861,072

(22) Filed: Jan. 3, 2018

(65) Prior Publication Data

US 2019/0202101 A1    Jul. 4, 2019

(51) Int. Cl.
  *B29C 48/04*    (2019.01)
  *B29C 64/209*    (2017.01)
  (Continued)

(52) U.S. Cl.
  CPC ............ *B29C 48/04* (2019.02); *B29C 48/154* (2019.02); *B29C 64/153* (2017.08);
  (Continued)

(58) Field of Classification Search
  CPC ....... B33Y 30/00; B33Y 40/00; B29C 64/214; B29C 64/205; B29C 64/209; B29C 64/153
  (Continued)

(56) References Cited

U.S. PATENT DOCUMENTS 6,336,480 B2    1/2002  Gaylo et al.
7,291,002 B2 *  11/2007  Russell ................. B41J 3/4073
                                                425/375
(Continued)

FOREIGN PATENT DOCUMENTS

CN          104924621 A     9/2015
DE      102014004633 A1    10/2015
(Continued)

OTHER PUBLICATIONS

"Rotary Table Conveyors" (Available, Mar. 26, 2017). https://www.multi-conveyor.com/conveyors/rotary-accumulation-tables (Year :2017).*

(Continued)

*Primary Examiner* — Matthew J Daniels
*Assistant Examiner* — Hana C Page
(74) *Attorney, Agent, or Firm* — Dority & Manning, P.A.

(57) ABSTRACT

An additive manufacturing system is provided. The additive manufacturing system includes a build platform and at least one workstation. The build platform defines a continuous workflow path and is configured to rotate about a build platform axis. The workstation is spaced apart from the build platform along the third direction and at least one of the build platform and the workstation is configured to move along the third direction. The workstation includes at least one particle delivery device, at least one recoating device, and at least one consolidation device. The particle delivery device is configured to deposit particles on the build platform. The recoating device is configured to distribute the deposited particles to form a build layer on the build platform. The consolidation device is configured to consolidate at least a portion of the build layer.

11 Claims, 9 Drawing Sheets

(51) Int. Cl.
    *B29C 64/223*     (2017.01)
    *B29C 64/153*     (2017.01)
    *B29C 64/241*     (2017.01)
    *B29C 48/154*     (2019.01)
    *B29C 64/205*     (2017.01)
    *B33Y 40/00*     (2020.01)
    *B33Y 50/02*     (2015.01)
    *B33Y 30/00*     (2015.01)

(52) U.S. Cl.
    CPC .......... *B29C 64/205* (2017.08); *B29C 64/209* (2017.08); *B29C 64/223* (2017.08); *B29C 64/241* (2017.08); *B33Y 40/00* (2014.12); *B33Y 30/00* (2014.12); *B33Y 50/02* (2014.12)

(58) Field of Classification Search
    USPC .......................................................... 264/241
    See application file for complete search history.

(56) References Cited

U.S. PATENT DOCUMENTS

| | | | |
|---|---|---|---|
| 8,021,138 | B2 | 9/2011 | Green |
| 9,346,127 | B2* | 5/2016 | Buller .................... B23K 26/16 |
| 9,597,730 | B2 | 3/2017 | Mironets et al. |
| 10,099,428 | B2* | 10/2018 | Ooba .................... B29C 64/165 |
| 2013/0189435 | A1 | 7/2013 | Mackie et al. |
| 2013/0264750 | A1 | 10/2013 | Hofacker et al. |
| 2014/0191439 | A1 | 7/2014 | Davis |
| 2014/0265034 | A1 | 9/2014 | Dudley |
| 2014/0314964 | A1 | 10/2014 | Ackelid |
| 2015/0224718 | A1 | 8/2015 | Ederer et al. |
| 2015/0251355 | A1 | 9/2015 | Rehme |
| 2016/0200084 | A1 | 7/2016 | Hays et al. |
| 2016/0263832 | A1 | 9/2016 | Bui et al. |
| 2016/0368050 | A1 | 12/2016 | Morris et al. |
| 2017/0157841 | A1 | 6/2017 | Green |
| 2017/0190112 | A1* | 7/2017 | Thorson ................ B33Y 30/00 |
| 2017/0232670 | A1 | 8/2017 | Joerger et al. |
| 2018/0085856 | A1* | 3/2018 | Bour .................... B23K 26/702 |
| 2018/0111319 | A1* | 4/2018 | Brezoczky ............ B23K 26/14 |
| 2019/0009338 | A1* | 1/2019 | Mcmurtry ............ B29C 64/153 |

FOREIGN PATENT DOCUMENTS

| | | |
|---|---|---|
| KR | 2016/0109866 A | 9/2016 |
| WO | WO2017/085469 A1 | 5/2017 |
| WO | 2017143145 A1 | 8/2017 |

OTHER PUBLICATIONS

Mindt et al., "Powder Bed Layer Characteristics: The Overseen First-Order Process Input", Metallurgical and Materials Transactions A, vol. 47, Issue: 8, pp. 3811-3822, Aug. 2016.
Examiner Inuials.
Supplementary EP Search Report for EP Application No. 18898485,0, dated Aug. 26, 2021.

* cited by examiner

SYSTEMS AND METHODS FOR ADDITIVE MANUFACTURING

BACKGROUND

The subject matter described herein relates generally to additive manufacturing systems, and, more particularly, to additive manufacturing systems including continuous additive manufacturing apparatuses.

At least some additive manufacturing systems involve the consolidation of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and LaserCusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) In at least some additive manufacturing systems, a new build layer of a particulate material is formed when a recoat device is used to recoat the component with newly deposited particulate material after each build layer is scanned by the laser beam. However, in at least some known systems, each step of the build process is performed sequentially and distinctly within a stationary particulate material bed, and the build time of a component is limited by the particulate deposition, distribution, and consolidation times for each build layer of the component.

BRIEF DESCRIPTION

In one aspect, an additive manufacturing system defining a first, longitudinal direction, a second, transverse direction, and a third, vertical direction, the three directions orthogonal to each other, is provided. The additive manufacturing system includes a build platform and at least one workstation. The build platform defines a continuous workflow path and is configured to rotate about a build platform axis. The at least one workstation is spaced apart from the build platform along the third direction and at least one of the build platform and the at least one workstation is configured to move along the third direction. The at least one workstation includes at least one particle delivery device, at least one recoating device, and at least one consolidation device. The at least one particle delivery device is configured to deposit particles on the build platform. The at least one recoating device is configured to distribute the deposited particles to form a build layer on the build platform. The at least one consolidation device is configured to consolidate at least a portion of the build layer.

In another aspect, an additive manufacturing system defining a first, longitudinal direction, a second, transverse direction, and a third, vertical direction, the three directions orthogonal to each other is provided. The additive manufacturing system includes at least one build platform, at least one workstation, and a build platform conveyor. The at least one workstation includes at least one particle delivery device, at least one recoating device, and at least one consolidation device. The at least one particle delivery device is configured to deposit particles on the build platform. The at least one recoating device is configured to distribute the deposited particles to form a build layer on the build platform. The at least one consolidation device is configured to consolidate at least a portion of the build layer. The build platform conveyor defines a continuous workflow path, wherein the build platform conveyor is configured to move the at least one build platform along the workflow path to the at least one workstation, and wherein at least one of the at least one build platform and the at least one workstation is configured to move along the third direction.

In yet another aspect, a method of fabricating a component using an additive manufacturing system is provided. The method includes moving at least one build platform relative to at least one workstation along a continuous workflow path. The at least one workstation includes at least one particle delivery device, at least one recoating device, and at least one consolidation device. The method also includes depositing particles onto the at least one build platform using the at least one particle delivery device. The method further includes distributing the deposited particles using the at least one recoating device to form a build layer. Finally, the method includes operating the consolidation device to consolidate at least a portion of the build layer.

DRAWINGS

These and other features, aspects, and advantages of the present disclosure will become better understood when the following detailed description is read with reference to the accompanying drawings in which like characters represent like parts throughout the drawings, wherein.

Figure 1:
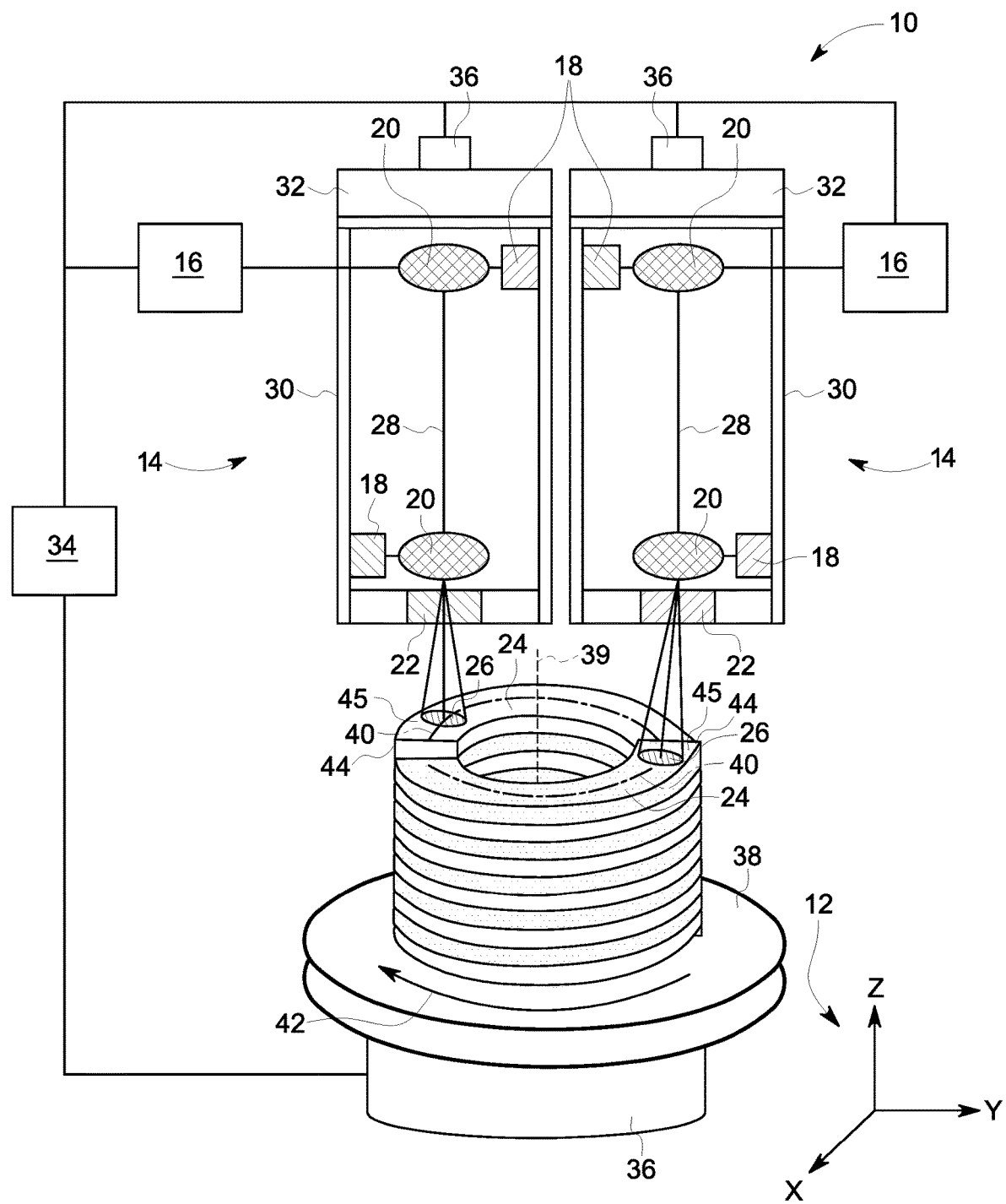
FIG. 1 is a schematic view of an exemplary continuous additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein include additive manufacturing systems including at least one workstation including at least one particle delivery device configured to deposit particles on at least one build platform, at least one recoating device configured to distribute the particles to form a build layer, and at least one consolidation device configured to consolidate at least a portion of the build layer. The at least one build platform is configured to move relative to the at least one workstation along a continuous workflow path. In one embodiment, the at least one build platform is a build platform defining a continuous workflow path, wherein the build platform is configured to rotate about a build platform axis, and wherein at least one of the build platform and the at least one workstation is configured to move along a vertical direction. In another embodiment, the at least one build platform is coupled to a build platform conveyor that is configured to move the at least one build platform along the workflow path to the at least one workstation, wherein at least one of the at least one build platform and the at least one workstation is configured to move along the vertical direction. The additive manufacturing systems facilitate improving system efficiencies by reducing inherent operational downtime necessitated by a sequential and distinct process-type system, reducing the time required to manufacture a component, and reducing the cost to additively manufacture the component.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Project, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary continuous additive manufacturing system 10. A coordinate system 12 includes an x-axis, a y-axis, and a z-axis, the three axes orthogonal to each other. In the exemplary embodiment, continuous additive manufacturing system 10 includes two consolidation devices 14, each consolidation device including a laser device 16, a pair of scanning motors 18, a pair of scanning mirrors 20, and a scanning lens 22 for fabricating a component 24 using a layer-by-layer manufacturing process. Alternatively, each consolidation device 14 may include any component that facilitates consolidation of a material using any of the processes and systems described herein. Laser devices 16 each provide a high-intensity energy source configured to generate a melt pool 26 (not shown to scale) in a powdered material using an energy beam 28. Each laser device 16 is coupled to one consolidation device 14 using fiber optic cable. A housing 30 of each consolidation device 14 is coupled to a mounting system 32. Continuous additive manufacturing system 10 also includes a computer control system, or controller 34.

Mounting system 32 is moved by an actuator or an actuator system 36 that is configured to move mounting system 32 in the X-direction, the Y-direction, and the Z-direction to cooperate with each scanning mirror 20 to facilitate fabricating a layer of component 24 within continuous additive manufacturing system 10. For example, and without limitation, mounting system 32 is pivoted about a central point, moved in a linear path, a curved path, and/or rotated to cover a portion of the powder on a circular build platform 38 to facilitate directing energy beam 28 along the surface of a plurality of particles 45 of a build layer 44 to form a layer of component 24. Alternatively, housing 30 and energy beam 28 are moved in any orientation and manner that enables continuous additive manufacturing system 10 to function as described herein.

Each scanning motor 18 is controlled by controller 34 and is configured to move one mirror 20 such that energy beam 28 is reflected to be incident along a predetermined path along build platform 38, such as, for example, and without limitation, a linear and/or rotational scan path 40. In the exemplary embodiment, the combination of scanning motor 18 and scanning mirror 20 forms a two-dimension scan galvanometer. Alternatively, scanning motors 18 and scanning mirrors 20 may include a three-dimension (3D) scan galvanometer, dynamic focusing galvanometer, and/or any other method that may be used to deflect energy beam 28 of laser device 16.

In the exemplary embodiment, build platform 38 is rotated in rotation direction 42 about a platform axis 39 by actuator system 36 to facilitate continuous deposition, distribution, and consolidation of particles 45. As described above with respect to mounting system 32, actuator system 36 is also configured to move build platform 38 in a Z direction (i.e., normal to a top surface of build platform 38) so that build layer 44 may be consolidated on top of a previously consolidated build layer 44. In some embodiments, actuator system 36 is also configured to move build platform 38 in the XY plane. For example, and without limitation, in an alternative embodiment where housing 30 is stationary, actuator system 36 rotates build platform 38 in rotation direction 42 and in the X-direction and/or Y-direction to cooperate with scanning motors 18 and scanning mirrors 20 to direct energy beams 28 of laser devices 16 along scan paths 40 about build platform 38. In the exemplary embodiment, actuator system 36 includes, for example, and without limitation, a linear motor(s), a hydraulic and/or pneumatic piston(s), a screw drive mechanism(s), and/or a conveyor system.

In the exemplary embodiment, continuous additive manufacturing system 10 is operated to fabricate component 24 from a computer modeled representation of the 3D geometry of component 24. The computer modeled representation may be produced in a computer aided design (CAD) or similar file. The CAD file of component 24 is converted into a layer-by-layer format that includes a plurality of build parameters for each layer of component 24, for example, a build layer 44 of component 24 including a plurality of particles 45 to be consolidated by continuous additive manufacturing system 10. In the exemplary embodiment, component 24 is modeled in a desired orientation relative to the origin of the coordinate system used in continuous additive manufacturing system 10. The geometry of component 24 is sliced into a stack of layers of a desired thickness, such that the geometry of each layer is an outline of the cross-section through component 24 at that particular layer location. Scan paths 40 are generated across the geometry of a respective layer. The build parameters are applied along scan path 40 to fabricate that layer of component 24 from particles 45 used to construct component 24. The steps are repeated for each respective layer of component 24 geometry. Once the process is completed, an electronic representation of scan paths 40 is generated, including all of the layers. The electronic representation of scan paths 40 is loaded into controller 34 of continuous additive manufacturing system 10 to control the system during fabrication of each layer.

After the electronic representation of scan paths 40 is loaded into controller 34, continuous additive manufacturing system 10 is operated to generate component 24 by implementing the layer-by-layer manufacturing process, such as a direct metal laser melting method, in a rotary manner, effecting a helical structure in component 24, for example. The exemplary layer-by-layer continuous additive manufacturing process does not use a pre-existing article as the precursor to the final component, rather the process produces component 24 from a raw material in a configurable form, such as particles 45. For example, and without limitation, a steel component can be additively manufactured using a steel powder. Continuous additive manufacturing system 10 enables fabrication of components, such as component 24, using a broad range of materials, for example, and without limitation, metals, ceramics, glass, and polymers.

Figure 2:
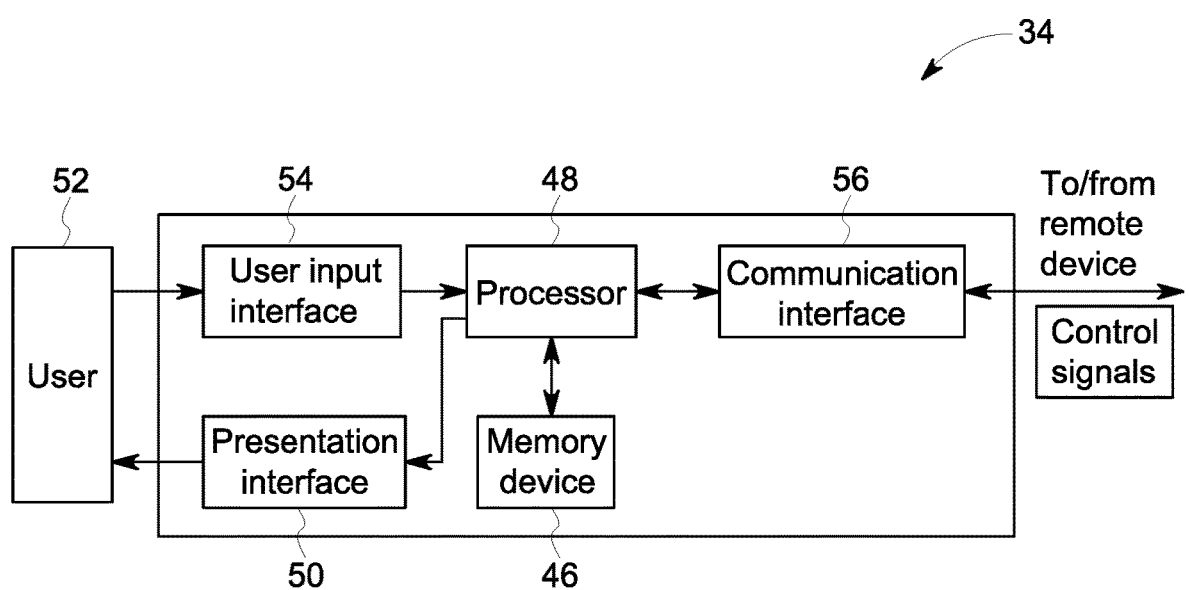
FIG. 2 is a block diagram of a controller that may be used to operate the additive manufacturing system shown in FIG. 1.

FIG. 2 is a block diagram of controller 34 that may be used to operate continuous additive manufacturing system 10 (shown in FIG. 1). In the exemplary embodiment, controller 34 is any type of controller typically provided by a manufacturer of continuous additive manufacturing system 10 to control operation of continuous additive manufacturing system 10. Controller 34 executes operations to control the operation of continuous additive manufacturing system 10 based at least partially on instructions from human operators. Controller 34 includes, for example, a 3D model of component 24 to be fabricated by continuous additive manufacturing system 10. Operations executed by controller 34 include controlling power output of laser device 16 (shown in FIG. 1) and adjusting mounting system 32 and/or build platform 38, via actuator system 36 (all shown in FIG. 1) to control the scanning velocity of energy beams 28. Controller 34 is also configured to control scanning motors 18 to direct scanning mirrors 20 to further control the scanning velocity of energy beams 28 within continuous additive manufacturing system 10. In alternative embodiments, controller 34 may execute any operation that enables continuous additive manufacturing system 10 to function as described herein.

In the exemplary embodiment, controller 34 includes a memory device 46 and a processor 48 coupled to memory device 46. Processor 48 may include one or more processing units, such as, without limitation, a multi-core configuration. Processor 48 is any type of processor that permits controller 34 to operate as described herein. In some embodiments, executable instructions are stored in memory device 46. Controller 34 is configurable to perform one or more operations described herein by programming processor 48. For example, processor 48 may be programmed by encoding an operation as one or more executable instructions and providing the executable instructions in memory device 46. In the exemplary embodiment, memory device 46 is one or more devices that enable storage and retrieval of information such as executable instructions or other data. Memory device 46 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 46 may be configured to store any type of data, including, without limitation, build parameters associated with component 24. In some embodiments, processor 48 removes or "purges" data from memory device 46 based on the age of the data. For example, processor 48 may overwrite previously recorded and stored data associated with a subsequent time or event. In addition, or alternatively, processor 48 may remove data that exceeds a predetermined time interval. In addition, memory device 46 includes, without limitation, sufficient data, algorithms, and commands to facilitate monitoring of build parameters and the geometric conditions of component 24 being fabricated by continuous additive manufacturing system 10.

In some embodiments, controller 34 includes a presentation interface 50 coupled to processor 48. Presentation interface 50 presents information, such as the operating conditions of continuous additive manufacturing system 10, to a user 52. In one embodiment, presentation interface 50 includes a display adapter (not shown) coupled to a display device (not shown), such as a cathode ray tube (CRT), a liquid crystal display (LCD), an organic LED (OLED) display, or an "electronic ink" display. In some embodiments, presentation interface 50 includes one or more display devices. In addition, or alternatively, presentation interface 50 includes an audio output device (not shown), for example, without limitation, an audio adapter or a speaker (not shown).

In some embodiments, controller 34 includes a user input interface 54. In the exemplary embodiment, user input interface 54 is coupled to processor 48 and receives input from user 52. User input interface 54 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 50 and user input interface 54.

In the exemplary embodiment, a communication interface 56 is coupled to processor 48 and is configured to be coupled in communication with one or more other devices, such as laser devices 16, and to perform input and output operations with respect to such devices while performing as an input channel. For example, communication interface 56 may include, without limitation, a wired network adapter, a wireless network adapter, a mobile telecommunications adapter, a serial communication adapter, or a parallel communication adapter. Communication interface 56 may receive a data signal from or transmit a data signal to one or more remote devices. For example, in some embodiments, communication interface 56 of controller 34 may transmit/receive a data signal to/from actuator system 36.

Presentation interface 50 and communication interface 56 are both capable of providing information suitable for use with the methods described herein, such as, providing information to user 52 or processor 48. Accordingly, presentation interface 50 and communication interface 56 may be referred to as output devices. Similarly, user input interface 54 and communication interface 56 are capable of receiving information suitable for use with the methods described herein and may be referred to as input devices.

Figure 3:
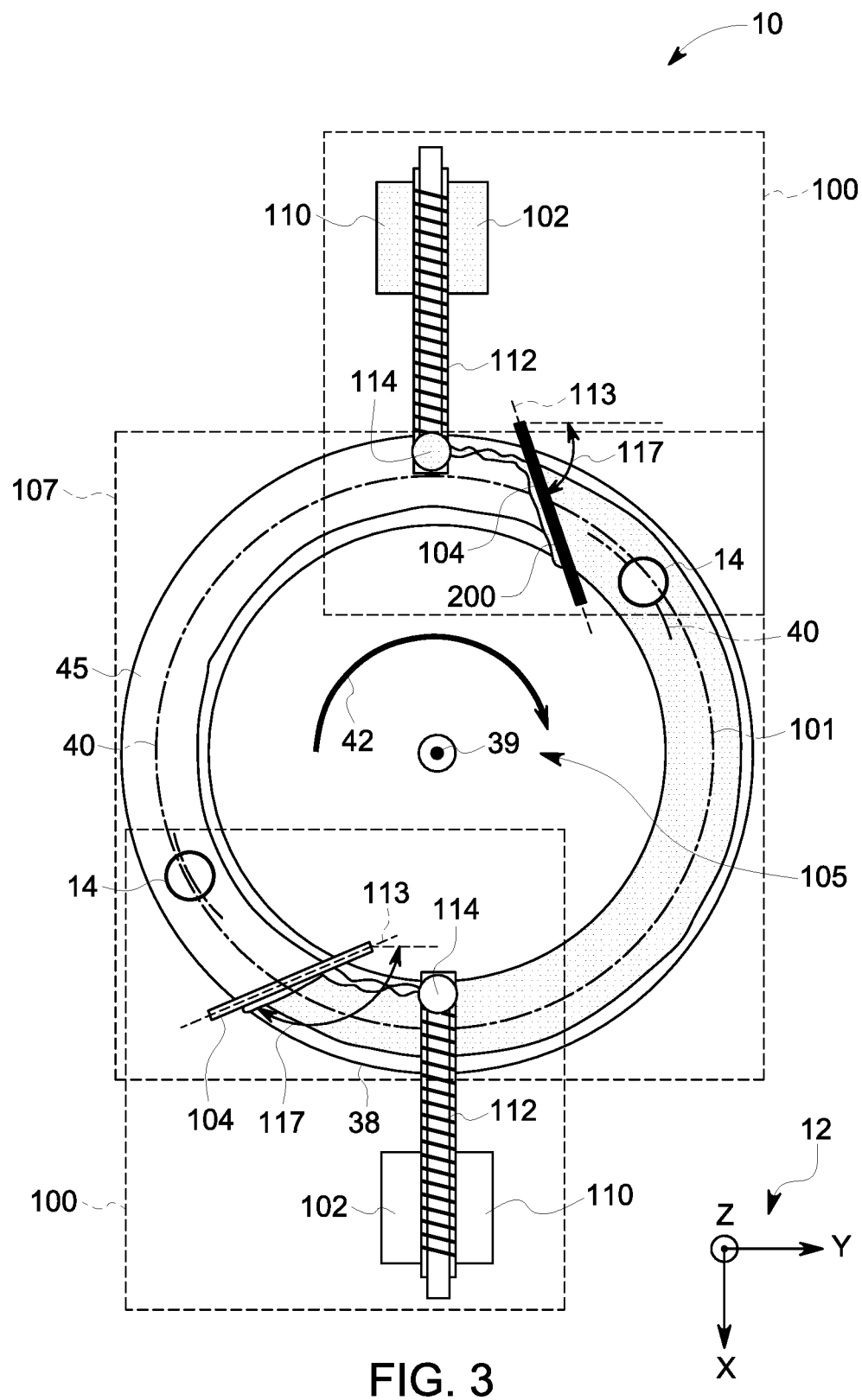
FIG. 3 is a plan schematic view of an exemplary build platform that may be used with the system shown in FIG. 1 illustrating two exemplary workstations.
Figure 4:
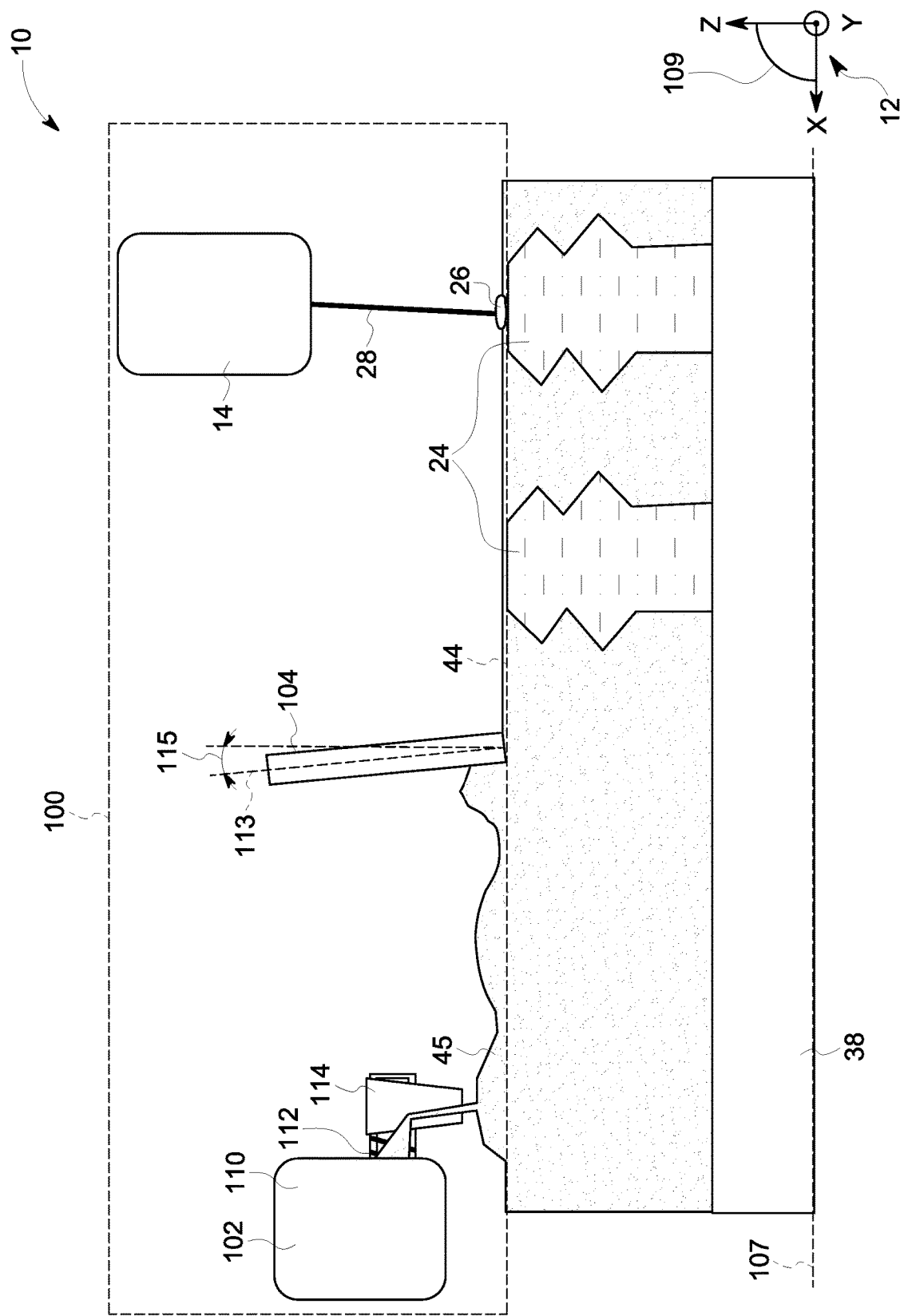
FIG. 4 is a schematic side view of one of the workstations shown in FIG. 3.
Figure 5:
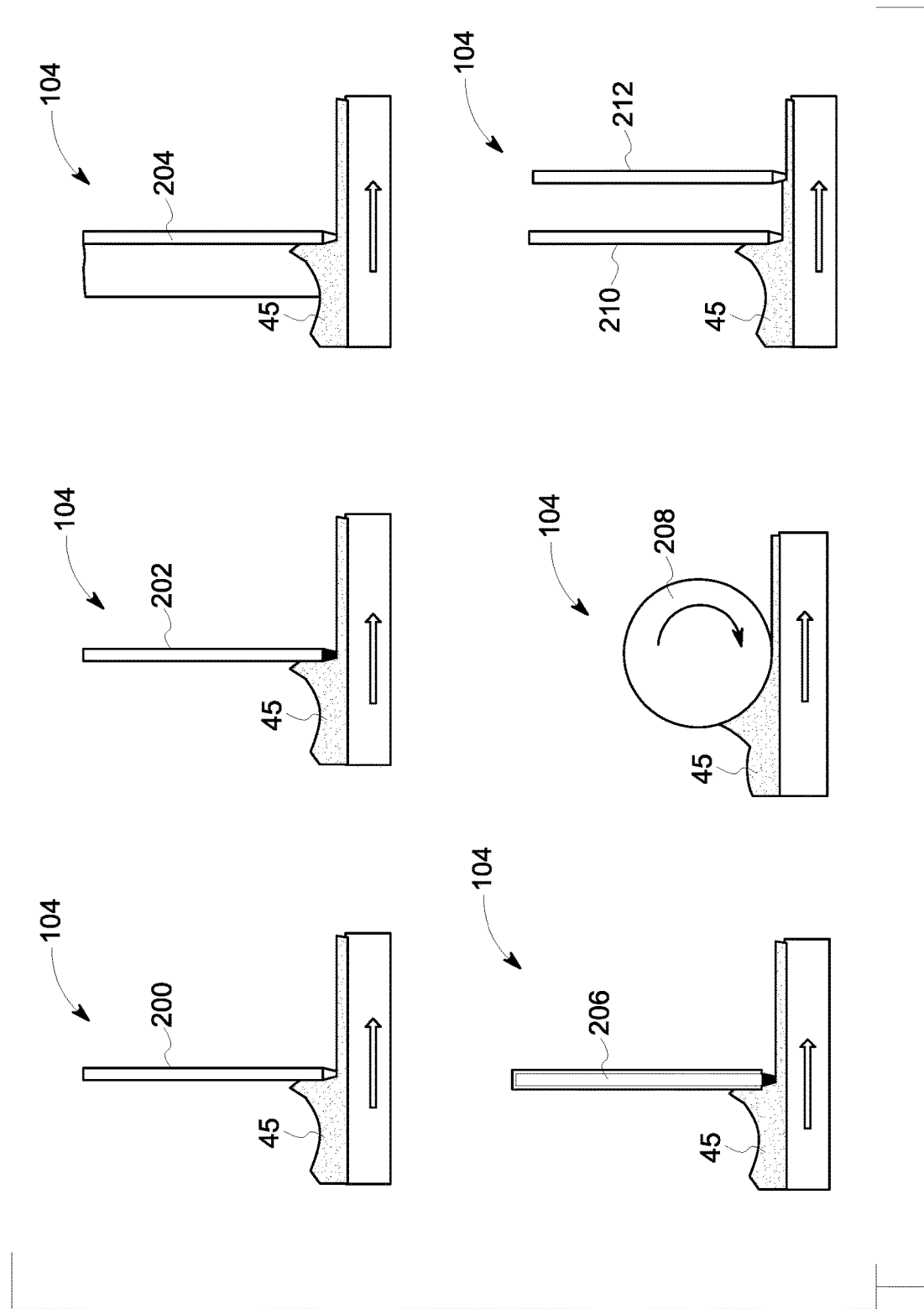
FIG. 5 is a plurality of side views of a plurality of recoating devices that may be used with the workstations shown in FIG. 3.
Figure 6:
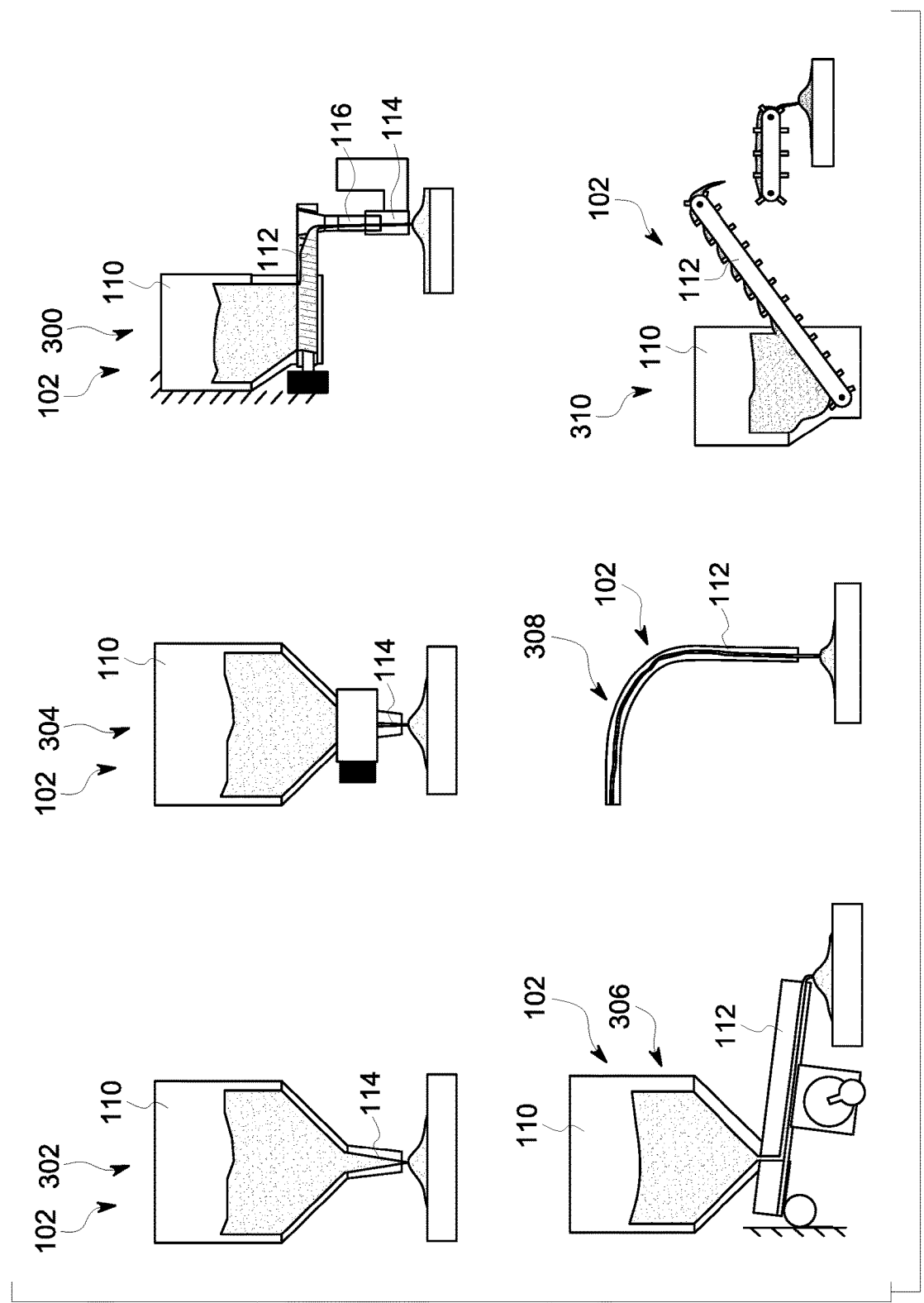
FIG. 6 is a plurality of side views of a plurality of particle delivery devices that may be used with the workstations shown in FIG. 3.

FIG. 3 is a plan schematic view of continuous additive manufacturing system 10 (shown in FIG. 1) illustrating two exemplary workstations 100. FIG. 4 is a side schematic view of build platform 38 (shown in FIG. 3) illustrating workstation 100. FIG. 5 is a plurality of side views of a plurality of recoating devices 104 that may be used with workstations 100 (shown in FIG. 3). FIG. 6 is a plurality of side views of a plurality of particle delivery devices 102 that may be used with workstations 100 (shown in FIG. 3). In the exemplary embodiment, build platform 38 and workstations 100 are configured to facilitate continuous consolidation of particles 45 to form at least one component 24. Each workstation 100 includes one consolidation device 14, a particle delivery device 102, and a recoating device 104. The shape and arrangement of build platform 38, workstations 100, and particles 45 are merely examples, and those of skill in the art will appreciate that build platform 38, workstations 100, and particles 45 may have any configuration that enables continuous additive manufacturing system 10 to function as described herein.

In the exemplary embodiment, build platform 38 is a circular disc defining a central, open portion 105. Build platform 38 defines a continuous workflow path 101 and is configured to rotate in rotation direction 42 about a platform axis 39. Additionally, build platform 38 defines a platform plane 107 oriented at a platform angle 109 relative to the Z-direction. In the exemplary embodiment, platform angle 109 is between approximately two hundred seventy-five degrees and eighty-five degrees. In alternative embodiments, platform angle 109 may be any value that facilitates operation of continuous additive manufacturing system 10 as described herein. In other alternative embodiments build platform 38 may be solid and may be one of rectangular, triangular, and elliptical in shape. In further alternative embodiments, build platform 38 may have any shape that facilitates operation of continuous additive manufacturing system 10.

In the exemplary embodiment, workstations 100 are spaced apart from build platform 38 along the Z-direction by a workstation height and are stationary. Build platform 38 is configured to move along the Z-direction relative to workstations 100. Each workstation 100 includes at least one particle delivery device 102, at least one recoating device 104, and at least one consolidation device 14. In alternative embodiments, workstations 100 may include any type and number of devices that facilitates operation of continuous additive manufacturing system 10 as described herein. In the exemplary embodiment, continuous additive manufacturing system 10 includes two workstations 100 positioned on opposite sides of build platform 38. In alternative embodiments, continuous additive manufacturing system 10 may include any number of workstations 100 that facilitates operations of continuous additive manufacturing system 10 as described herein.

In the exemplary embodiment, each workstation 100 includes one recoating device 104. Recoating device 104 is configured to distribute particles 45 to form build layer 44 on build platform 38. More specifically, recoating device 104 mechanically redistributes particles 45 across the surface of build platform 38 such that a consistent lateral distribution and depth of particles across build platform 38 is achieved to form build layer 44. In one embodiment, recoating device 104 is a rigid blade recoating device 200 that defines a recoating device plane 113 oriented at a first recoating device angle 115 relative to the Z-direction and at a second recoating device angle 117 relative to the X-direction. In the exemplary embodiment, one recoating device 104 is oriented to distribute particles 45 from a radially inner portion of build platform 38 to a radially outer portion of build platform 38 and one recoating device 104 is oriented to distribute particles 45 from a radially outer portion of build platform 38 to a radially inner portion of build platform 38. In an alternative embodiment, recoating devices 104 may be configured to distribute particles 45 from any portion of build platform 38 to any other portion of build platform 38 that facilitates operation of continuous additive manufacturing system 10 as described herein. In another alternative embodiment, recoating device 104 may be one of a compliant recoating device 202 configured to be at least partially deformable in response to encountering obstacles during the recoating process, a curved and/or angled recoating device 204 configured to distribute particles 45 along a specific XY-direction, a vibrating recoating device 206 configured to vibrate during the recoating process to facilitate distributing particles 45, a counter-rotating recoating device 208 configured to rotate relative to particles 45 to facilitate distributing particles 45, and a fine recoating device 210 and a coarse recoating device 212 configured to facilitate distributing particles in steps. In other alternative embodiments, each recoating device 104 may define a plane oriented at any angle relative to any direction that facilitates operation of continuous additive manufacturing system 10 as described herein.

In the exemplary embodiment, each workstation 100 includes one particle delivery device 102. Particle delivery device 102 is configured to deposit particles on build platform 38 at a rate that may be controlled to facilitate fabricating component 24 by continuous additive manufacturing system 10. More specifically, particle delivery device 102 deposits particles 45 on an area of build platform 38 that facilitates recoating device 104 distributing and leveling particles 45 to form build layer 44. Particle delivery device 102 may include a particle hopper 110, a particle feeder 112, and a feed restrictor or nozzle 114. In one embodiment, particle delivery device 102 is a screw-feed particle delivery device 300, including a hopper 110, a screw-type feeder 112, a telescoping guide tube 116, and a nozzle 114. In alternative embodiments, particle delivery device 102 may be one of a fixed orifice funnel particle delivery device 302 configured to deposit particles 45 on build platform 38 at a constant rate, a valved variable orifice particle delivery device 304 configured to deposit particles 45 on build platform 38 at varying rates, a vibrating channel particle delivery device 306 configured to use vibration to facilitate transferring particles 45 from hopper 110 to build platform 38, a gas-blown particle delivery device 308 configured to use a pressurized gas to entrain and deposit particles 45 on build platform 38, and a conveyor particle delivery device 310 configured to use a conveyor to deposit particles 45 on build platform 38.

Figure 7:
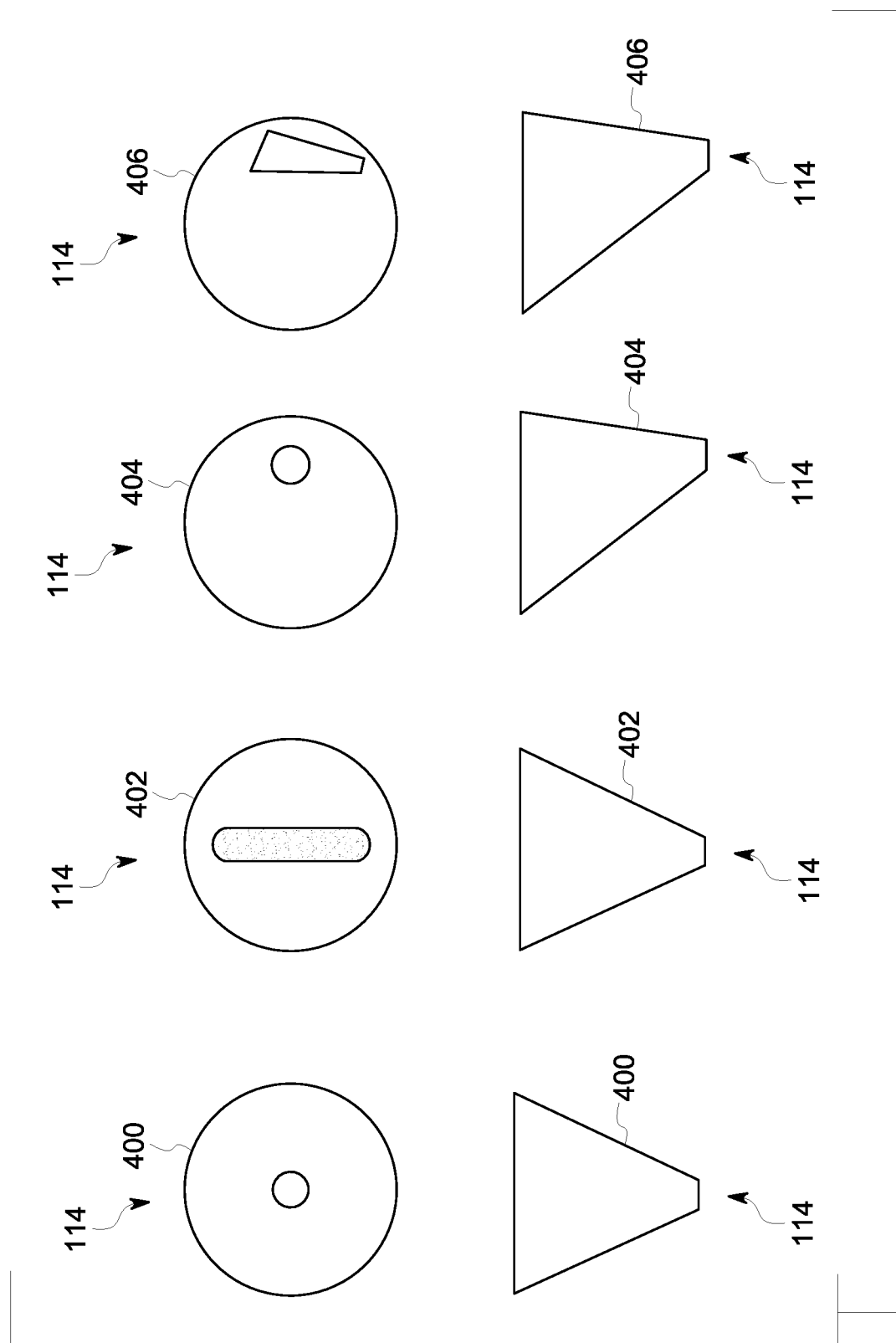
FIG. 7 is a plurality of top and side views of a plurality of nozzles that may be used with the particle delivery devices shown in FIG. 6.

FIG. 7 is a plurality of top and side views of a plurality of nozzles 114 that may be used with particle delivery device 102 (shown in FIG. 6). In the exemplary embodiment, nozzle 114 is a circular symmetric nozzle 400 and is configured to control a flow of particles 45 from feeder 112 of particle delivery device 102. In an alternative embodiment, nozzle 114 may be one of a symmetric slotted nozzle 402 including a symmetric particle-metering slot, an asymmetric circular nozzle 404 including a circular particle-metering opening positioned along an edge of nozzle 404, and an asymmetric arbitrary nozzle 406 including a non-symmetric particle-metering opening positioned in any portion of nozzle 406. In other alternative embodiments, each nozzle 114 may include a non-circular top portion. In yet other alternative embodiments, particle delivery device 102 may include any nozzle 114 that facilitates operation of continuous additive manufacturing system 10 as described herein.

Figure 8:
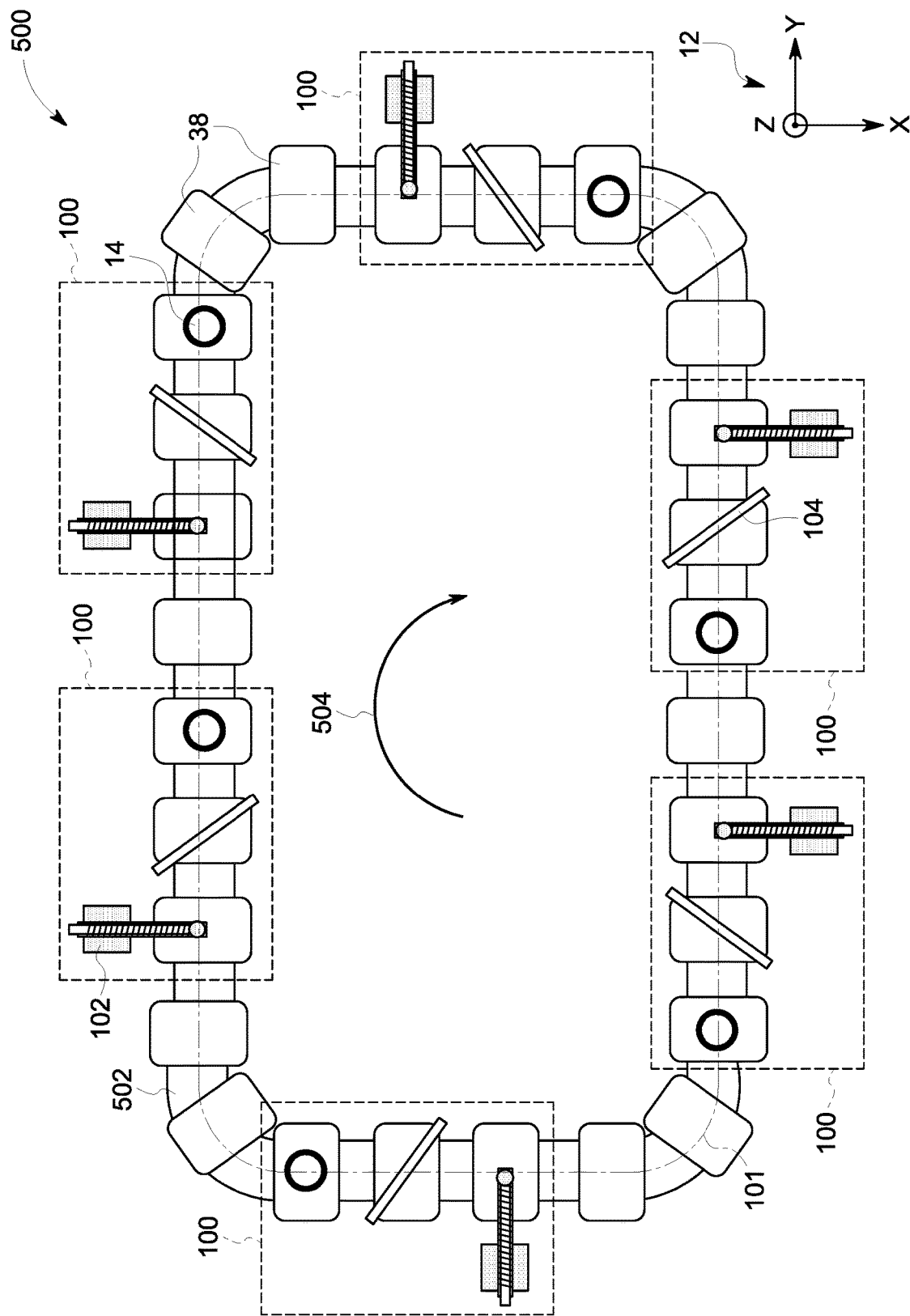
FIG. 8 is a plan schematic view of an alternative embodiment of the continuous additive manufacturing system shown in FIG. 1.

FIG. 8 is a plan schematic view of a continuous additive manufacturing system 500 that is an alternative embodiment of continuous additive manufacturing system 10 (shown in FIG. 1). The embodiment shown in FIG. 8 is substantially identical to the embodiment show in FIG. 1, except continuous additive manufacturing system 500 includes a build platform conveyor 502 that moves modular build platforms 38 relative to workstations 100 in an XY-plane along a continuous workflow path 101 in a rotation direction 504. In the exemplary embodiment, build platform conveyor 502, modular build platforms 38, and workstations 100 are configured to cooperate to facilitate continuous consolidation of particles 45 to form at least one component 24. The shape and arrangement of build platform conveyor 502, modular build platforms 38, and workstations 100 are merely examples, and those of skill in the art will appreciate that build platform conveyor 502, modular build platforms 38, and workstations 100 may have any configuration that enables continuous additive manufacturing system 500 to function as described herein.

In the exemplary embodiment, continuous additive manufacturing system 500 includes six workstations 100 and twenty-eight modular build platforms, each modular build platform 38 coupled to build platform conveyor 502. In the exemplary embodiment, build platform conveyor 502 defines a continuous rectangular workflow path 101. In alternative embodiments, workflow path 101 may have any shape, including, but not limited to, circular, elliptical, and triangular. Build platform conveyor 502 is configured to move each modular build platform 38 along workflow path 101 to each workstation 100. In the exemplary embodiment, workstations 100 are configured to move along the Z-direction. In an alternative embodiment, build platform conveyor 502 is configured to move along the Z-direction and workstations 100 are stationary. In further alternative embodiments, build platform conveyor 502 may be configured in any manner that facilitates operation of continuous additive manufacturing system 500 as described herein.

Figure 9:
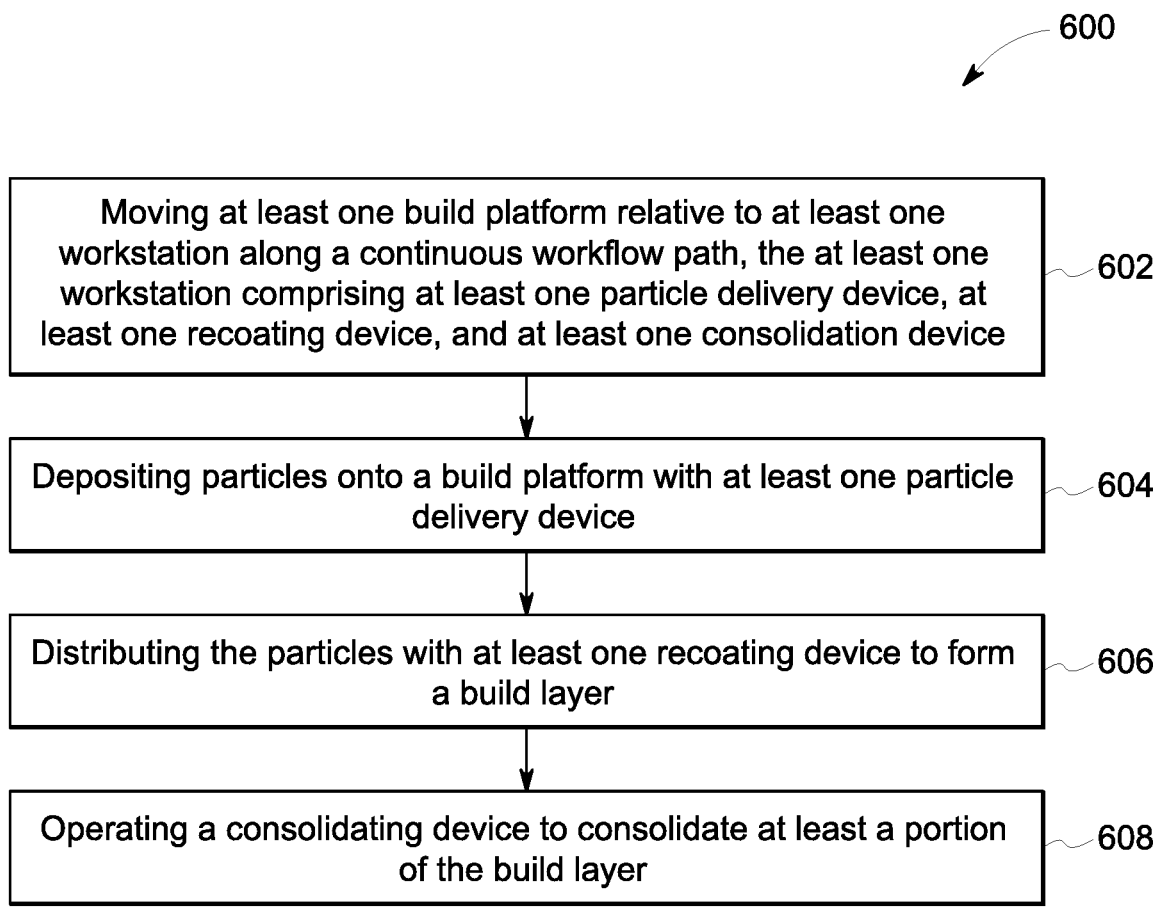
FIG. 9 is a flowchart of an exemplary method that may be used to fabricate a component using the additive manufacturing systems shown in FIGS. 1 and 8.

FIG. 9 is a flowchart of an exemplary method that may be used to fabricate a component 24 using continuous additive manufacturing system 10 and/or continuous additive manufacturing system 500 (shown in FIGS. 1 and 8, respectively).

Referring to FIGS. 1-8, method 600 includes moving 602 at least one build platform 38 relative to at least one workstation 100 along a continuous workflow path 101, wherein the at least one workstation includes at least one particle delivery device 102, at least one recoating device 104, and at least one consolidation device 14. Method 600 also includes depositing 604 particles 45 onto a build platform with at least one particle delivery device 102. Method 600 further includes distributing 606 particles 45 with at least one recoating device 104 to form a build layer 44. Finally, method 600 includes operating 608 a consolidation device 14 to consolidate at least a portion of build layer 44. In the exemplary embodiment, steps 602-608 of method 600 may be performed substantially simultaneously, with each step 602-608 utilizing spatially separated components of continuous additive manufacturing system 10. In an alternative embodiment, steps 602-608 may be separated temporally.

The embodiments described herein include additive manufacturing systems including at least one workstation including at least one particle delivery device configured to deposit particles on said build platform, at least one recoating device configured to distribute the particles to form a build layer, and at least one consolidation device configured to consolidate at least a portion of the build layer. The additive manufacturing systems also include at least one build platform configured to move relative to the at least one workstation along a continuous workflow path. In one embodiment, the at least one build platform is a build platform defining a continuous workflow path, wherein the build platform is configured to rotate about a build platform axis, and wherein at least one of the build platform and the at least one workstation is configured to move along a vertical direction. In another embodiment, the at least one build platform is coupled to a build platform conveyor that is configured to move the at least one build platform along the workflow path to the at least one workstation, wherein at least one of the at least one build platform and the at least one workstation is configured to move along the vertical direction. The additive manufacturing systems facilitate improving system efficiencies by reducing inherent operational downtime necessitated by a sequential and distinct process-type system, reducing the time required to manufacture a component, and reducing the cost to additively manufacture the component.

An exemplary technical effect of the methods, systems, and apparatus described herein includes at least one of: a) improving additive manufacturing system efficiency, b) reducing the required build time for an additively manufactured component, c) improving the production rate of additively manufacturing a component, and d) reducing the cost of additively manufacturing a component.

Exemplary embodiments of additive manufacturing systems that include continuous manufacturing apparatuses are described above in detail. The additive manufacturing systems, and methods of using such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system defining a first, longitudinal direction, a second, transverse direction, and a third, vertical direction, the three directions orthogonal to each other, said additive manufacturing system comprising:
   at least one build platform, wherein said build platform defines a platform plane oriented at the third angle relative to the third direction, wherein the third angle is between approximately eighty-five degrees and two hundred seventy-five degrees,
   at least one workstation spaced apart from the build platform along the third direction and fixed in a position in an XY-plane so that the build platform moves relative to the at least one workstation in the XY-plane, wherein said at least one workstation is configured to move along the third direction, and wherein said build platform conveyor is stationary with respect to the third direction, the at least one workstation comprising:
      at least one particle delivery device, said particle delivery device configured to deposit particles on said at least one build platform;
      at least two recoating devices comprising a first recoating device and a second recoating device, the first recoating device configured to distribute the deposited particles from a radially inner portion of said build platform to a radially outer portion of said build platform to form a build layer on said at least one build platform, the first recoating device defining a plane defining a first recoating device angle relative to a Z-direction and a second recoating device angle relative to an X-direction, wherein the first recoating device angle is an angle other than 90 degrees, and wherein the second recoating device angle is an angle other than 90 degrees relative to the continuous workflow path in a plane of the build platform, and the second recoating device defining a plane oriented at an angle other than 90 degrees relative to the continuous workflow path in the plane of the build platform to distribute particles from said radially outer portion to said radially inner portion; and
      at least one consolidation device, said consolidation device configured to consolidate at least a portion of the build layer; and
   a build platform conveyor that moves along in a rotation direction, said build platform conveyor defining a continuous workflow path, said build platform configured to rotate about a build platform axis, wherein said build platform conveyor is configured to move said at least one build platform along the continuous workflow path to said at least one workstation such that the plane of the first recoating device and the plane of the second recoating device each, respectively, define an angle other than 90 degrees relative to the continuous workflow path in a plane of the at least one build platform and relative to a Z-direction, wherein the build platform moves relative to the at least one workstation in the XY-plane, and wherein at least one of said at least one build platform and said at least one workstation is configured to move along the third direction.

2. The additive manufacturing system of claim 1, wherein the continuous workflow path is one of rectangular, circular, and elliptical.

3. The additive manufacturing system of claim 1, wherein said at least one particle delivery device comprises at least one of a fixed orifice funnel dispenser, a variable-valve orifice dispenser, a screw-feed dispenser, a vibrating channel dispenser, a gas-blown dispenser, and a conveyor dispenser.

4. The additive manufacturing system of claim 1, wherein said at least one particle delivery device comprises at least one nozzle comprising at least one of a symmetric circular nozzle, a symmetric slotted nozzle, an asymmetric circular nozzle, and an asymmetric arbitrary nozzle.

5. The additive manufacturing system of claim 1, wherein said at least one recoating device comprises at least one of a hard blade recoating device, a compliant recoating device, a vibrating recoating device, and a counter-rotating roller recoating device.

6. The additive manufacturing system of claim 1, wherein said particle delivery device comprises a particle hopper and a screw-type feeder.

7. A method of fabricating a component using an additive manufacturing system, the additive manufacturing system defining a first, longitudinal direction, a second, transverse direction, and a third, vertical direction, the three directions orthogonal to each other, said method comprising:
moving at least one build platform relative to at least one workstation along a build platform conveyor defining a continuous workflow path in an XY-plane, the build platform defining a platform plane oriented at a third angle relative to the third direction, wherein the third angle is between approximately eighty-five degrees and two hundred seventy-five degrees, the at least one workstation being fixed in a position in the XY-plane, at least one workstation spaced apart from the build platform along the third direction and fixed in a position in an XY-plane so that the build platform moves relative to the at least one workstation in the XY-plane, wherein said at least one workstation is configured to move along the third direction, and wherein said build platform conveyor is stationary with respect to the third direction, the at least one workstation comprising:
at least one particle delivery device;
at least two recoating devices comprising a first recoating device and a second recoating device, the first recoating device defining a plane defining a first recoating device angle relative to a Z-direction and a second recoating device angle relative to an X-direction, wherein the first recoating device angle is an angle other than 90 degrees, and wherein the second recoating device angle is an angle other than 90 degrees relative to the continuous workflow path in a plane of the build platform, and the second recoating device defining a plane oriented at an angle other than 90 degrees relative to the continuous workflow path in the plane of the build platform; and
at least one consolidation device;
depositing particles onto the at least one build platform using the at least one particle delivery device;
distributing, via the first recoating device, the deposited particles from a radially inner portion of said build platform to a radially outer portion of said build platform to form a build layer;
distributing, via the second recoating device, the deposited particles from the radially outer portion of said build platform to a radially inner portion of said build platform to form a build layer;
rotating the build platform about a build platform axis; and
operating the at least one consolidation device to consolidate at least a portion of the build layer.

8. The method in accordance with claim 7, wherein the at least one build platform is configured to rotate about a build platform axis.

9. The method in accordance with claim 7, wherein the at least one build platform is one of rectangular, circular, and elliptical.

10. The method in accordance with claim 7, wherein moving the at least one build platform comprises moving the at least one build platform using a build platform conveyor defining the continuous workflow path.

11. The method in accordance with claim 10, wherein the continuous workflow path is one of rectangular, circular, and elliptical.

* * * * *